United States Patent [19]
Kocian et al.

[11] Patent Number: 6,012,742
[45] Date of Patent: Jan. 11, 2000

[54] PIPING

[75] Inventors: Frank Kocian, Neckartailfingen; Richard Kochendoerfer, Stuttgart, both of Germany

[73] Assignee: Deutsche Forschungsanstalt Fuer Luft -und Raumfahrt e.V., Bonn, Germany

[21] Appl. No.: 08/977,381

[22] Filed: Nov. 24, 1997

Related U.S. Application Data

[63] Continuation of application No. PCT/EP96/02183, May 21, 1996.

[30] Foreign Application Priority Data

May 24, 1995 [DE] Germany .............................. 195 19 111

[51] Int. Cl.⁷ ...................................................... F10L 9/04
[52] U.S. Cl. ........................... 285/94; 285/114; 285/363; 285/906; 138/123
[58] Field of Search ............................. 285/305, 94, 114, 285/363, 906; 138/123

[56] References Cited

U.S. PATENT DOCUMENTS

| | | | |
|---|---|---|---|
| Re. 30,489 | 1/1981 | Abbott | 138/123 |
| 1,294,921 | 2/1919 | Lewis | 285/305 X |
| 1,982,732 | 12/1934 | Fletcher et al. | 285/305 X |
| 2,189,987 | 2/1940 | Kellems | 285/305 X |
| 2,434,358 | 11/1948 | Frank | 285/305 X |
| 2,711,331 | 6/1955 | Temple | 285/305 X |
| 2,750,210 | 6/1956 | Trogdon et al. | 285/305 X |
| 3,029,094 | 4/1962 | Parlasca et al. | 285/93 X |
| 3,232,640 | 2/1966 | Donkle | 285/93 |
| 3,631,897 | 1/1972 | Fischer et al. | |
| 4,159,027 | 6/1979 | Cuillet | 138/123 |
| 4,200,126 | 4/1980 | Fish . | |

FOREIGN PATENT DOCUMENTS

| | | |
|---|---|---|
| 2 491 044 | 4/1982 | France . |
| 11 62 648 | 2/1964 | Germany . |
| 34 25 209 | 2/1985 | Germany . |
| 34 32 905 | 3/1986 | Germany . |
| 40 05 772 | 9/1991 | Germany . |

*Primary Examiner*—Dave W. Arola
*Attorney, Agent, or Firm*—Barry R. Lipsitz; Ralph F. Hoppin

[57] ABSTRACT

In order to improve a piping comprising at least one pipe and reinforcement on the outer wall of each pipe in such a way as to increase the maximum permissible internal operating pressure, it is proposed that the reinforcement should be capable of expansion along the length of the pipe and capable of contracting radially in such a way that a bias pressure can be applied to the pipe around its circumference by the longitudinal expansion of the reinforcement.

55 Claims, 4 Drawing Sheets

PIPING

The present disclosure relates to the subject matter disclosed in PCT Application No. PCT/EP96/02183 of May 21, 1996, the entire specification of which is incorporated herein by reference.

BACKGROUND OF THE INVENTION

This application is a continuation of International PCT Application No. PCT/EP96/02183 filed on May 21, 1996.

The invention relates to a piping comprising at least one pipe and a reinforcement arranged on an outer wall of each pipe.

Such pipings are known in large numbers from prior art.

Pipings comprising glass pipes provided with a metal jacket reinforcement or a plastic coating are known in particular.

Such metal or plastic reinforcements are provided in order to protect the piping from external damage, resulting e.g. from a foreign body impacting it. They are not however capable of substantially increasing the internal compressive load which the piping can be expected to bear.

Particularly for pipings with pipes made of a brittle material such as glass, which can only be loaded in tension to a limited extent, it would however be desirable considerably to increase the permissible internal compressive load, in order to open up new applications for such pipings in the high-pressure range.

The problem underlying the invention was therefore to improve a piping of the above type so as to increase the maximum internal pressure at which the piping can be operated.

SUMMARY OF THE INVENTION

In a piping of that type the problem is solved, in that the reinforcement can be expanded longitudinally of the pipe and has a transverse contraction capacity such that a compressive bias around the circumference of the pipe can be applied to the pipe by expanding the reinforcement longitudinally of the pipe.

The concept of the invention thus offers the advantage that a compressive bias can be applied to each pipe in the line through transverse contraction of the reinforcement supported on the outer wall of the pipe as a result of longitudinal expansion thereof, the bias being opposed to the tensile stress on the pipe around the circumference, caused by the internal operating pressure of the piping.

Particularly in brittle materials such as glass the compressive strength is far greater than the tensile strength, and consequently the compressive bias can readily be chosen so that it compensates for the tensile stress around the circumference of the pipe caused by a considerable internal operating pressure (e.g. 40 bar with an inside diameter of 150 mm), without any fear of the piping failing if the internal pressure should drop.

Another advantage of the piping according to the invention is that, should the pipes fail, they will not break disastrously but merely form short cracks, through which the fluid contained in the piping can only escape in small volumes and through which the internal pressure can only drop gradually, thus leaving adequate time for damage limitation.

When the reinforcement is expanded longitudinally of the pipe, it is shrunk onto it by transverse contraction and supported by the pipe, and hence a reinforcement arranged on the pipe sets up greater resistance to longitudinal expansion than the same reinforcement would without the supporting pipe. This effect will hereinafter be referred to as impedance of transverse contraction.

The elasticity of the reinforcement when expanded longitudinally of the pipe with impedance of transverse contraction is greater than its elasticity without such impedance. The increase corresponds to the compressive biassing of the pipe around the circumference.

In order to enable a desired expansion of the reinforcement and thus a desired compressive bias to be produced with the lowest possible stresses, it is therefore advantageous that, on expansion of the reinforcement longitudinally of the pipe without any impedance of transverse contraction, the elasticity of the reinforcement should be at the most approximately equal to its elasticity on expansion of the reinforcement longitudinally of the pipe with transverse contraction impeded by the pipe.

It is particularly beneficial that the elasticity of the reinforcement without any impedance of transverse contraction should be at the most approximately half and preferably at the most approximately one-tenth of the elasticity of the reinforcement with transverse contraction impeded.

Ideally the elasticity of the reinforcement without impedance of transverse contraction would be zero, since all the stress applied to expand the reinforcement would then be converted to a compressive bias on the pipe.

In order to facilitate the longitudinal expansion and accompanying transverse contraction of the reinforcement but to prevent it from slipping along the piping, it is advantageous for the reinforcement to be fixed relative to the pipe and longitudinally thereof in fixing areas spaced apart longitudinally of the pipe, and to be capable of sliding over the outer wall of the pipe between the fixing areas.

It is particularly beneficial if the transverse contraction number of the reinforcement is a minimum of approximately 0.4 and preferably a minimum of approximately 0.1.

The reinforcement advantageously has at least one aperture. The outside wall of the pipe is accessible through such an aperture, so that its condition can be checked while the piping is in operation.

If the pipe is itself made of a transparent material such as glass, the transparency is retained by virtue of the aperture in the reinforcement; this brings the advantage that the filling level of a fluid contained in the piping can be checked from outside.

It is beneficial for the reinforcement to be pre-expanded longitudinally of the pipe, and for a compressive bias around the circumference of the pipe to be applied to the pipe through the pre-expansion of the reinforcement. The meaning of the term "pre-expansion" is an expansion of the reinforcement longitudinally of the pipe, which is already present when the piping is not under an internal compressive load, i.e. which is not caused only by longitudinal expansion of the pipe as a result of the internal operating pressure. Such pre-expansion enables any optional compressive bias to be applied to the pipe around its circumference, even in its inoperative state without any internal pressure.

It is particularly beneficial for the compressive bias of the pipe around the circumference to be opposed and substantially equal to the tensile stress on the pipe in that direction, caused by the internal operating pressure on the pipe. The effect of this is that, at the operative internal pressure which prevails during normal operation, the compressive bias and the tensile stress on the pipe around the circumference just counterbalance each other, so that the pipe is stress-free in that direction. In such a stress-free condition the pipe is particularly resistant to external damage.

As a means of expanding the reinforcement longitudinally of the pipe, the piping advantageously has force introduction means for admitting force to the reinforcement longitudinally of the pipe.

A structurally inexpensive construction for the piping is obtained if the reinforcement is at the same time fixed relative to the pipe by the force introduction means, thus preventing it from slipping along the piping.

Particularly simple introduction of a longitudinal force into the reinforcement to expand it longitudinally can be obtained, if the reinforcement contains apertures into which force introduction elements of the force introduction means engage.

Provision may particularly be made for the force introduction elements to form a positive connection with the reinforcement, which connection fixes the reinforcement longitudinally of the pipe relative to the force introduction elements. A positive connection of this type between the reinforcement and the elements is reliable and inexpensive to make.

The force introduction elements may form the positive connection with edgings of apertures in the reinforcement.

It is particularly beneficial, however, for the force introduction elements to form the positive connection together with edgings of apertures in the reinforcement and with positive connection elements, which are arranged between the force introduction elements and the edgings and made of hardened material, the hardened material being inserted in pasty or fluid form. With positive connection elements of this type, surface contact of all the members involved in the connection can be obtained, even when the geometry of the force introduction elements does not specially match that of the edgings of the apertures. It is also possible to vary the position of the force introduction elements relative to the edgings of the apertures when assembling the piping, as different spacings between those elements and the edgings are compensated for by the positive connection elements arranged between them. This allows larger tolerances in both the manufacture of the reinforcement and the assembly of the piping, thus saving time and expense and allowing greater flexibility in the make-up of the piping.

The force introduction means of a pipe are advantageously arranged at an end portion of the pipe. With such an arrangement the force introduction means can not only fulfil their function of admitting force into the reinforcement longitudinally of the pipe; they can also take over the additional function of interconnecting adjacent pipes or connecting the piping with other components of an installation including the piping.

No details have yet been given of the make-up of the force introduction means.

In a preferred embodiment of the piping according to the invention the force introduction means of a pipe comprise at least one flange element, to which the force introduction elements are attached.

It is particularly beneficial if a force in the longitudinal direction of the pipe can be directed into the flange element, for example by fastening the flange element to another member of the piping.

If the force introduction means of a pipe are additionally to take over the function of a pipe connection at which two pipes adjoin, it is advantageous for the piping to include a flange element to which force introduction elements of one pipe and of the other pipe are attached.

Alternatively or in addition to this arrangement, the piping may comprise a first flange element to which force introduction elements of one pipe are attached, and a second flange element to which force introduction elements of the other pipe are attached, the first flange element and the second flange element being capable of being attached to each other an adjustable distance apart longitudinally of the pipes. In this embodiment the reinforcements of the two pipes involved in the pipe connection can be expanded longitudinally of the pipes by reducing the distance between the first and second flange element.

In order that the extension of the reinforcement longitudinally of the pipe or the length of the reinforced pipe need not be designed for use in a piping of predetermined geometry at the production stage, it is advantageous for the reinforcement to have apertures arranged in a substantially periodic pattern longitudinally of the pipe. The reinforcement or reinforced pipe may in that case be shortened to the required length during assembly of the piping, and a plurality of pipe lengths can be made, the lengths differing by an integral multiple of the periodicity length of the periodic pattern of the apertures.

It is thus possible in particular to manufacture the reinforcement or reinforced pipe continuously in an automated production process, and only to cut it into lengths in the required manner during assembly of the piping.

In order to have a narrow enough raster of feasible pipe lengths available, it is beneficial for the pattern of apertures to have a periodicity length less than approximately one-fifth and preferably less than approximately one-tenth of the circumference of the pipe.

Flexibility in forming the piping is further increased if the pattern of apertures is made up of a plurality of component patterns which are substantially periodic longitudinally of the pipe and which have substantially the same periodicity length, the apertures in one respective component pattern being offset from the apertures in the other component patterns longitudinally of the pipe, by a distance shorter than the periodicity length of the component patterns. In this case the distance between successive available pipe lengths is shorter than the periodicity length of the entire pattern of apertures, since the apertures in the component pattern which are most suitable according to the pipe length can be used e.g. to form a positive connection with the force introduction elements of the force introduction means.

If there are two component patterns offset longitudinally of the pipe by a distance equal to half the periodicity length of one component pattern, all pipe lengths which differ from each other by a multiple of half the periodicity length will then be available.

In a preferred embodiment of the piping according to the invention the reinforcement comprises a lattice of intersecting lattice bars expanding along the outer wall of the pipe. With a lattice of this type any transverse contraction numbers can in principle be obtained by suitably directing the lattice bars. Moreover the transverse contraction number of a lattice can be adjusted more easily and more exactly than that of a homogeneous shell structure. In addition, the lattice is expanded longitudinally of the pipe primarily through shear deformation and longitudinal expansion of the lattice bars rather than through bending deformation of the bars. The lattice material is therefore stressed substantially in one direction only, that of the bars, so the full unidirectional strength of the material can be utilized.

As the lattice in itself, unsupported internally on the outer wall of the pipe, would set up little resistance to a change of length owing to shearing effects, that it to say, as it has only relatively little elasticity, the lattice material is substantially subjected only to stresses which are necessary to produce the desired compressive bias on the pipe around the circumference.

Another advantage of the lattice is that its structure may be an open one with a very high superficial proportion of apertures, so that the pipe reinforcement can be comparatively light, using little material, and can thus be produced costeffectively.

A lattice of this type can be made particularly easily in a manual or automatic wrapping process if it comprises families of lattice bars, the bars of each family being aligned parallel with the bars of the same family and crossing the bars of other families.

The families of lattice bars are preferably associated in pairs, the bars of one family of a pair and the bars of the other family being aligned at equal, opposing angles to the longitudinal direction of the pipe. The effect is that the lattice and thus the compressive bias distribution created in the pipe are rotationally symmetrical relative to the longitudinal axis of the pipe.

The simplest way of controlling the transverse contraction behavior of the lattice and the most cost-effective way of manufacturing it is for the lattice to comprise only two families of lattice bars, the bars of one family and the bars of the other family preferably being aligned at equal, opposing angles to the longitudinal direction of the pipe.

It is especially beneficial for the opposing equal angle to be approximately 58 to 68°, particularly approximately 63.5°.

It should be pointed out here that the angles mentioned above and below refer in each case to the smaller of the two angles which the lattice bars form with the longitudinal direction of the pipe.

If the two families of lattice bars are at opposing equal angles of approximately 63.5° to the longitudinal direction of the pipe, the transverse contraction number of the lattice will be approximately 0.5.

Vector resolution of the forces transmitted along the lattice bars into components in the longitudinal and the circumferential direction of the pipe shows that in this case the forces transmitted around the circumference are approximately twice as strong as those in the longitudinal direction. The compressive bias around the circumference of the pipe which can be produced in the pipe by means of the lattice is consequently approximately twice as strong as that in the longitudinal direction. On the other hand, according to the well-known boiler formula, the ratio of tensile stresses in the circumferential and the longitudinal direction of the pipe, produced by an internal operating pressure in the pipe, is also 2:1, and hence the tensile stresses thus produced can, with the given lattice geometry, be compensated for by suitable longitudinal expansion of the lattice in the circumferential and longitudinal direction of the pipe simultaneously, so that the pipe is ideally free of stress in the circumferential and longitudinal direction.

The local longitudinal expansion of the reinforcement (the lattice) and thus the compressive bias applied to the pipe may be undesirably reduced by friction between the reinforcement and the outer wall of the pipe.

If the reinforcement is fixed on the pipe in fixing areas, the compressive bias may in particular diminish towards a central area of the pipe between the fixing areas.

As a means of reducing this undesirable effect, in a lattice comprising two families of bars aligned at opposing equal angles to the longitudinal direction of the pipe, the opposing equal angles may advantageously vary along the pipe.

Thus it is beneficial for the opposing equal angle to increase uniformly from one fixing area of the pipe to the next.

It is especially beneficial for the opposing equal angle to increase uniformly from the fixing areas of the pipe to the central area of the pipe between the fixing areas thereof.

In areas where the opposing equal angle to the longitudinal direction of the pipe is small the effect of friction on longitudinal expansion of the lattice is reduced, while in areas where it is large the compressive bias which can be applied to the pipe around the circumference is greater.

By reducing the opposing equal angle near the fixing areas of the pipe, greater local longitudinal expansion can therefore be transferred to the central area of the pipe.

No details have yet been given of the material of which the reinforcement of the piping according to the invention is made.

It is advantageous for the reinforcement to consist at least partiy of a fibre composite. Where such composites are used it is possible, by varying the stiffness and orientation of the fibres, to affect the transverse contraction behavior of the reinforcement and, even with a homogeneous shell structure, to obtain transverse contraction numbers up to 2.0. If a reinforcement in the form of a lattice is used there is the added advantage that fibre composites have particularly high unidirectional strength in the direction of the fibres.

It is advantageous for the reinforcement to consist at least partly of carbon fibres, as a means of obtaining particularly high strength for it, with comparatively low weight.

If the reinforcement alternatively or additionally consists at least partly of glass fibres production costs can be saved, provided that the mechanical demands on it are not too high.

As already mentioned, the compressive bias applied to the pipe may be undesirably reduced by friction between the reinforcement and the outer wall of the pipe.

It is therefore advantageous if a lubricant to reduce the friction, for example a creep oil, is arranged between the reinforcement and the outer wall of the pipe.

The surface of the reinforcement facing towards the outer wall of the pipe may in particular be provided with a lubricant.

Alternatively or in addition, a lubricant may be embedded in a matrix of the reinforcement surrounding the fibres.

By virtue of the ratio of tensile stresses in the circumferential and longitudinal direction of the pipe, produced by internal pressure in the pipe as predetermined by the above-mentioned boiler formula, the tensile stress occurring around the circumference generally limits the ability of the piping to be loaded internally in compression.

However, in order to avoid a catastrophic bursting action still better should the pipe fail, and in order to make the piping more resistant to external damage, e.g. through a foreign body impacting it, it is advantageous if a compressive bias longitudinally of the pipe can additionally be applied to the pipe. This bias compensates at least partly for the tensile stress longitudinally of the pipe produced by the internal operating pressure.

It is particularly beneficial for a compressive bias longitudinally of the pipe to be applied to the pipe, the bias being opposite and substantially equal to the tensile stress on the pipe longitudinally thereof, caused by the internal operating pressure on the pipe, since a stress-free condition of the pipe in its longitudinal direction is thereby obtained.

Other features and advantages of the invention are the subject of the following description and drawings of an example.

DETAILED DESCRIPTION OF THE INVENTION

A piping according to the invention, illustrated in FIGS. 1 to 6 and referred to generally as 20, comprises a plurality of hollow cylindrical, coaxial pipes 22 of equal diameter arranged axially one behind the other.

Each of the pipes 22 may, for example, be made of a brittle, fragile material such as glass.

A reinforcement is arranged on an outer wall 24 of each pipe 22, in the form of a lattice 26 lying on the wall 24.

Figure 3:
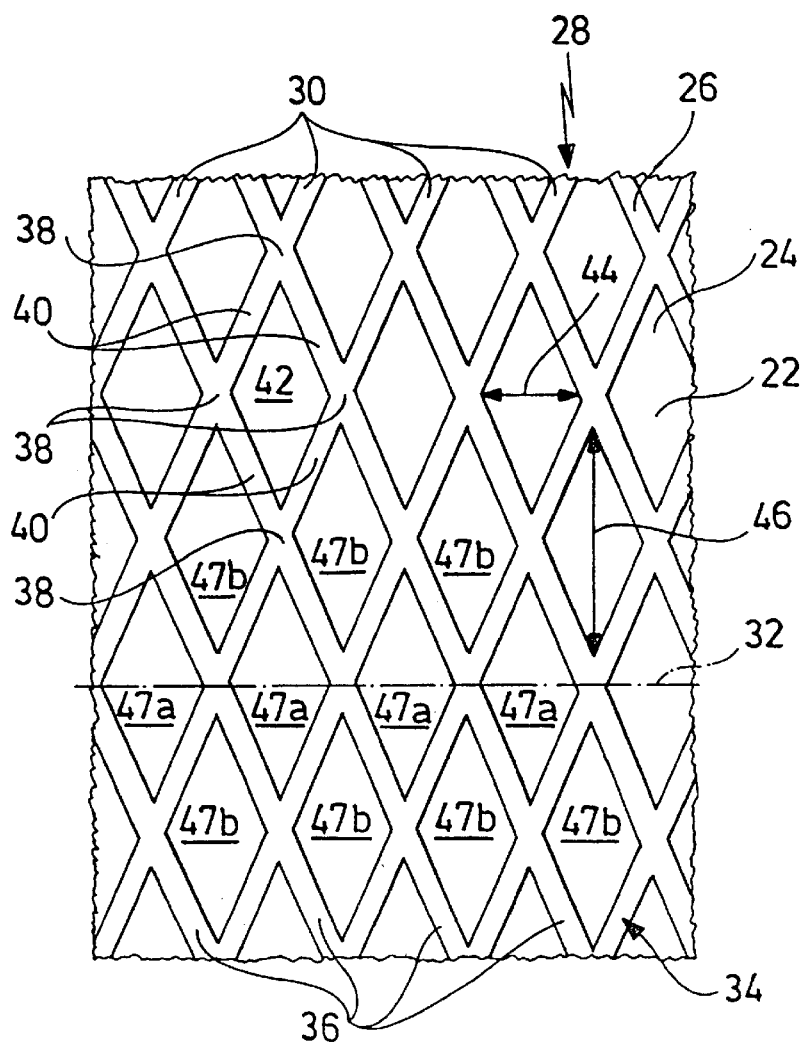
FIG. 3 is a fragment of a development of the piping according to the invention in the region I in FIG. 1.

As can be seen best from the development in FIG. 3, each lattice 26 includes a first family 28 of a plurality of lattice bars 30, e.g. ten bars, which surround the respective pipe 22 helically and which are aligned at a constant angle of plus about 63° to the direction of the longitudinal axis 32 of the pipes 22.

The lattice bars 30 of the first family 28 are parallel and equidistant from each other.

The lattice 26 further includes a second family 34 of a plurality of lattice bars 36, e.g. again ten bars, which surround the respective pipe 22 helically and which are aligned at a constant angle of minus about 63° to the direction of the longitudinal axis 32 of the pipes 22.

The lattice bars 36 of the second family 34 are also parallel and equidistant from each other.

The lattice bars 30 of the first family 28 cross the lattice bars 36 of the second family 34 at lattice nodes 38. A section of a bar 30 or 36 fixed between a pair of nodes 38 will henceforth be referred to as a lattice brace 40. Four respective nodes 38 and the four braces 40 arranged between them bound a substantially lozenge-shaped lattice aperture 42.

Owing to the alignment of the lattice bars 30, 36 described above, each of the lattice apertures 42 has a first diagonal 44 in the longitudinal direction of the pipes 22 and a second diagonal 46 in their circumferential direction; the length of the second diagonal 46 is approximately twice that of the first diagonal 44.

As can best be seen from FIG. 3, the lozenge-shaped apertures 42 form two periodic component patterns 47a and 47b longitudinally of the pipe 22, the periodicity length of each component pattern 47a, 47b corresponding to the distance between two successive lattice nodes 38 longitudinally of the pipe 22, and the apertures 42 in one pattern 47a being offset from those in the other pattern 47b longitudinally of the pipe 22, by a distance equal to half the periodicity length.

The lattice bars 30, 36 are preferably made of a fibre composite comprising e.g. carbon or glass fibres. The use of glass fibres lowers material costs, while if carbon fibres are used in a lattice 26 of the same weight higher strength and rigidity can be obtained than with glass fibres, or higher rigidity can be obtained in a lattice of lower weight and the same strength.

The lattices 26 may be produced on the actual pipes 22 to be reinforced, by winding the fibres onto the outer wall 24 of the respective pipe 22 in the direction of the lattice bars 30, 36. It is beneficial to wind them so that a fibre of a bar 30 of the first family 28 and a fibre of a bar 36 of the second family 34 alternately intersect at the lattice nodes 38.

Particularly if the lattices 26 are to be made by a manual winding process it is beneficial to arrange lozenge-shaped mouldings, e.g. wax mouldings, on the outer wall 24 of the pipe 22 in the positions envisaged for the lattice apertures 42 before the winding operation, so that passages to receive the fibres to be wound on are formed between the wax mouldings.

The winding operation is followed by a heat ageing process, in the course of which the wax mouldings used can possibly be removed by melting.

Instead of the lattice 26 being made on the actual pipe 22 to be reinforced, it may be produced by winding onto another winding frame then pulled onto the pipe 22.

Figure 4:
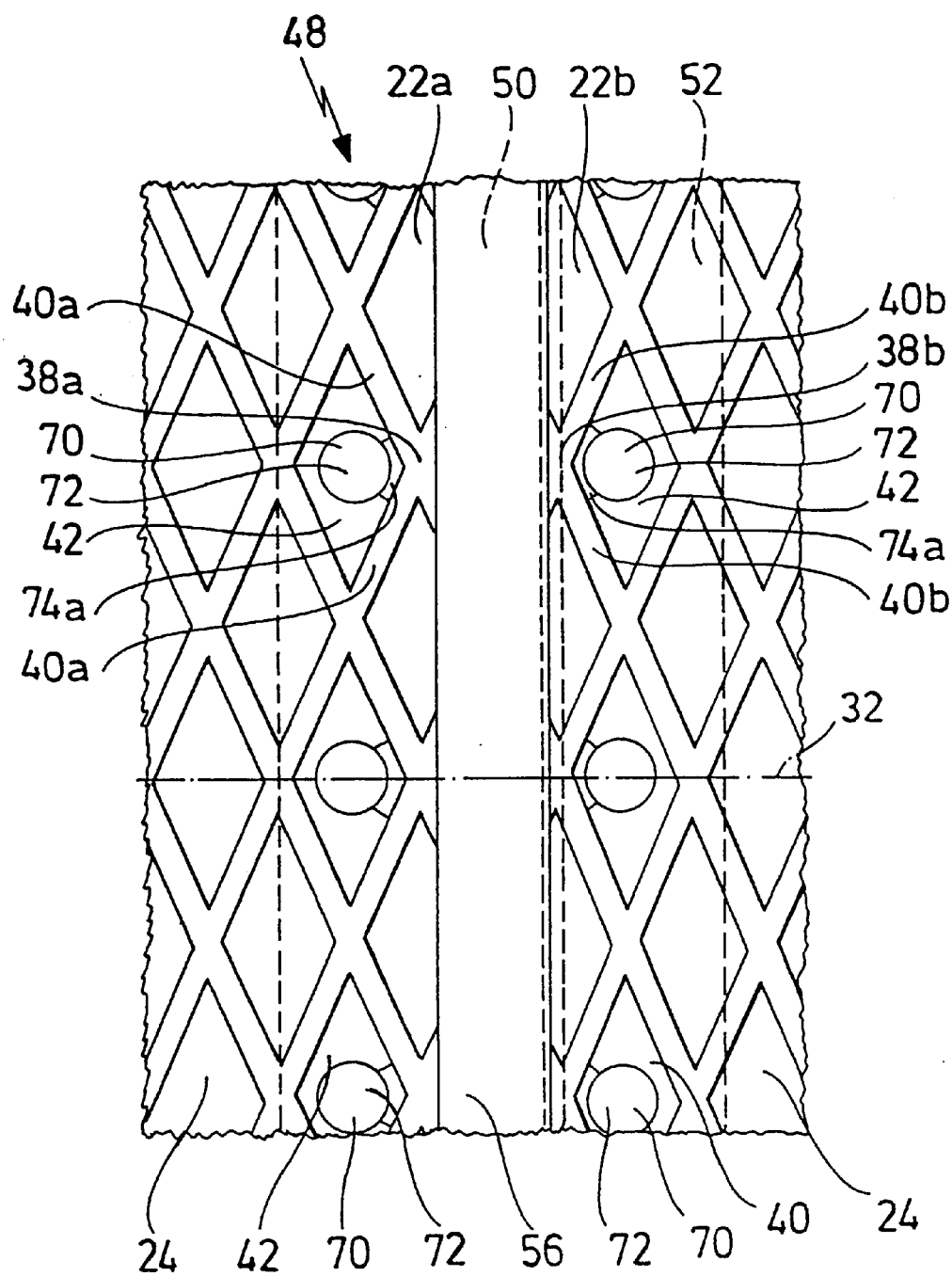
FIG. 4 is a fragment of a development of the piping according to the invention in the region II in FIG. 1.
Figure 5:
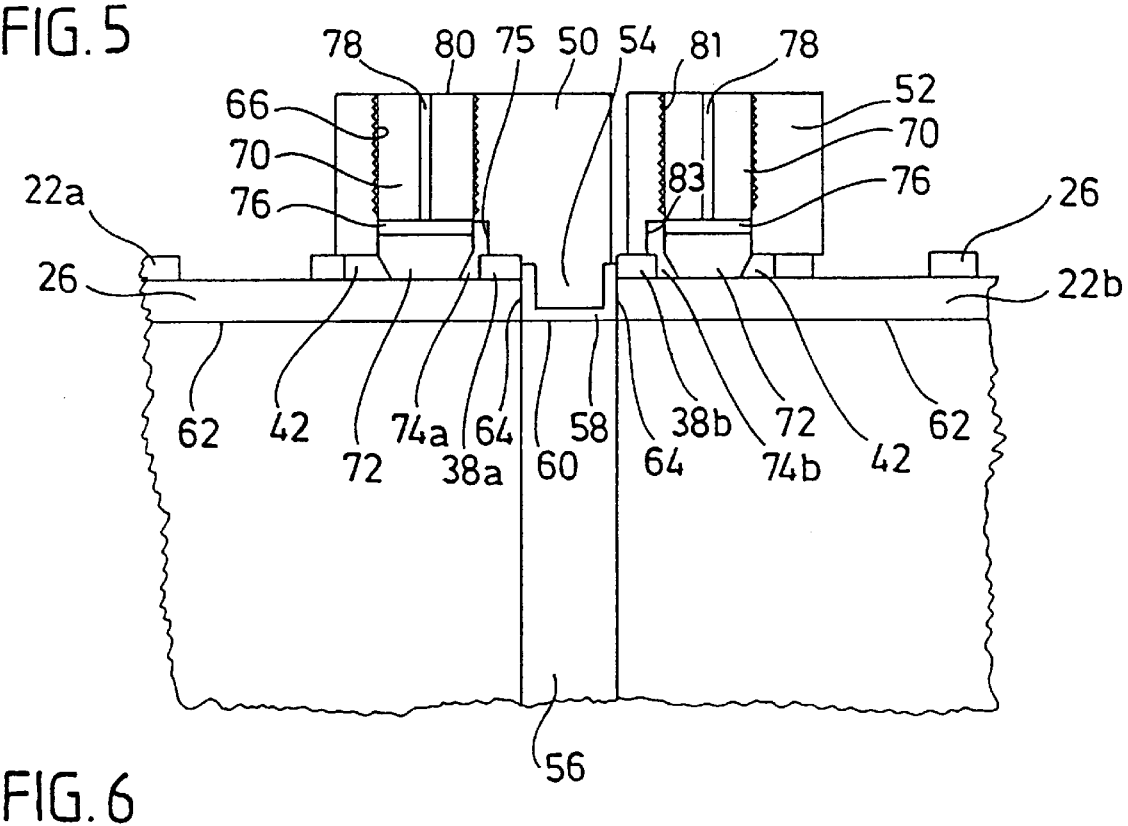
FIG. 5 is a longitudinal section, taken along the line 5—5 in FIG. 1, through a pipe connection in the piping according to the invention.
Figure 6:
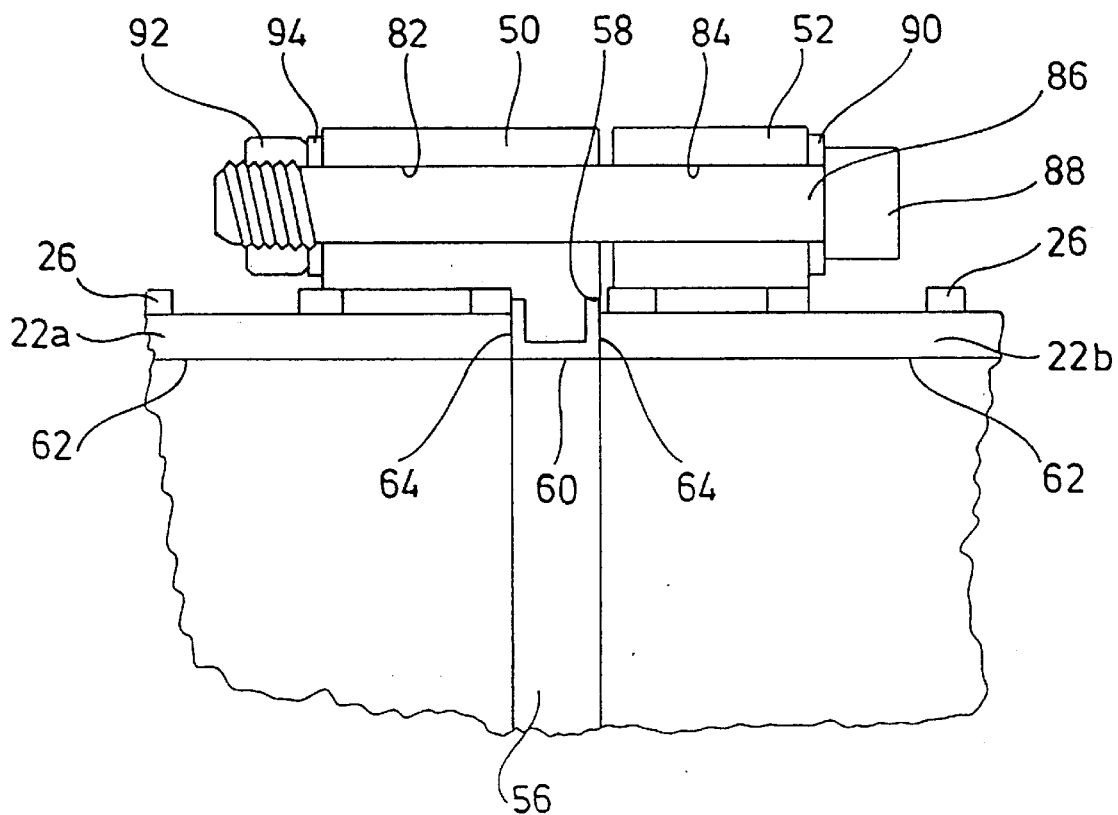
FIG. 6 is a longitudinal section, taken along the line 6—6 in FIG. 1, through a pipe connection in the piping according to the invention.

As a means of fixing the lattices 26 to the end portions of the pipes 22 and coupling pairs of pipes 22 together, the piping 20 has pipe connections referred to generally as 48 and shown in detail in FIGS. 4 to 6.

Each of the pipe connections 48 comprises a substantially hollow cylindrical, first flange element 50, concentrically surrounding an end portion of the first of the pipes to be coupled (referred to as 22a in FIGS. 4 to 6), and a substantially hollow cylindrical, second flange element 52, concentrically surrounding an end portion (facing towards the first pipe 22a) of the second of the pipes to be coupled (referred to as 22b in FIGS. 4 to 6). The flange elements 50 and 52 are represented in broken lines in the development shown in FIG. 4.

The inside of the first flange element 50 carries an annular projection 54 of rectangular cross-section, engaging in a gap 56 between the pipes 22a and 22b.

The projection 54 in turn carries an annular seal 58 of substantially U-shaped cross-section, of which the underside 60 facing away from the projection 54 is flush with the inner walls 62 of the two pipes 22a and 22b; the side surfaces 64 of the seal 58 lie against the ends of the pipes 22a and 22b, so that the seal shuts off the inside of the pipes 22a and 22b tightly from the outside thereof.

The first flange element 50 contains a plurality of tapped holes 66, e.g. ten holes, arranged equidistant from each other along its circumference and passing through the element 50 in a radial direction.

A fixing pin 70 with external thread is screwed into each of the tapped holes 66; its lower end carries a frustoconical force introduction tip 72, which engages in one of the apertures 42 of the lattice 26 on the first pipe 22a and lies on the outer wall 24 of the first pipe 22a.

A positive connection element 74a is arranged between each force introduction tip 72 and the next lattice node in the direction of the second pipe 22b, referred to as 38a in FIGS. 4 and 5; the tip 72 and two lattice braces 40a adjacent the node 38a lie flat against the element 74a, thereby preventing any movement of the tip 72 and node 38a towards each other.

The positive connection element 74a comprises a filling material which has been hardened in the gap between the force introduction tip 72 and the lattice node 38a, for example a thickened resin or cement or a low boiling point metal alloy.

To allow insertion of filling material in the said gap, the fixing pin 70 contains a radial filling passage 76, which passes through it in a radial direction and opens into a recess 75 in the flange element 50 outside the pin 70, and a central axial filling passage 78 connecting the top 80 of the pin 70 to the radial passage 76.

The recess 75 in the flange element 50 forms a connection between one end of the radial filling passage 76 and the interior of the element 50, while the end of the radial filling passage 76 remote from the recess 75 is closed by the flange element, so that no filling material can exit there.

Like the first flange element 50 the second flange element 52 has tapped holes 81 and recesses 83 arranged equidistant from each other along its circumference and passing through the second element in a radial direction. A fixing pin 70, identical with the fixing pin 70 in the tapped holes 66 of the first flange element 50, is screwed into each of the tapped holes 81 of the second flange element 52; its tapering force introduction tip 72 engages in an aperture 42 in the lattice 26 of the second pipe 22b of the pipe connection 48, with its underside lying on the outer wall 24 of the second pipe 22b.

A positive connection element 74b is arranged between each force introduction tip 72 and the next lattice node 38b in the direction of the first pipe 22a; the tip 72 and lattice braces 40b adjacent the node 38b lie flat against the element 74b, thereby preventing any movement of the tip 72 and node 38b towards each other.

Like the positive connection element 74a the positive connection element 74b is formed by injecting a paste-like or liquid, quick-setting filling material through an axial filling passage 78 and a radial filling passage 76 in the relevant fixing pin 70 and the respective recess 83 into the gap between the force introduction tip 72 and the lattice node 38b, and allowing it to set there.

Figure 1:
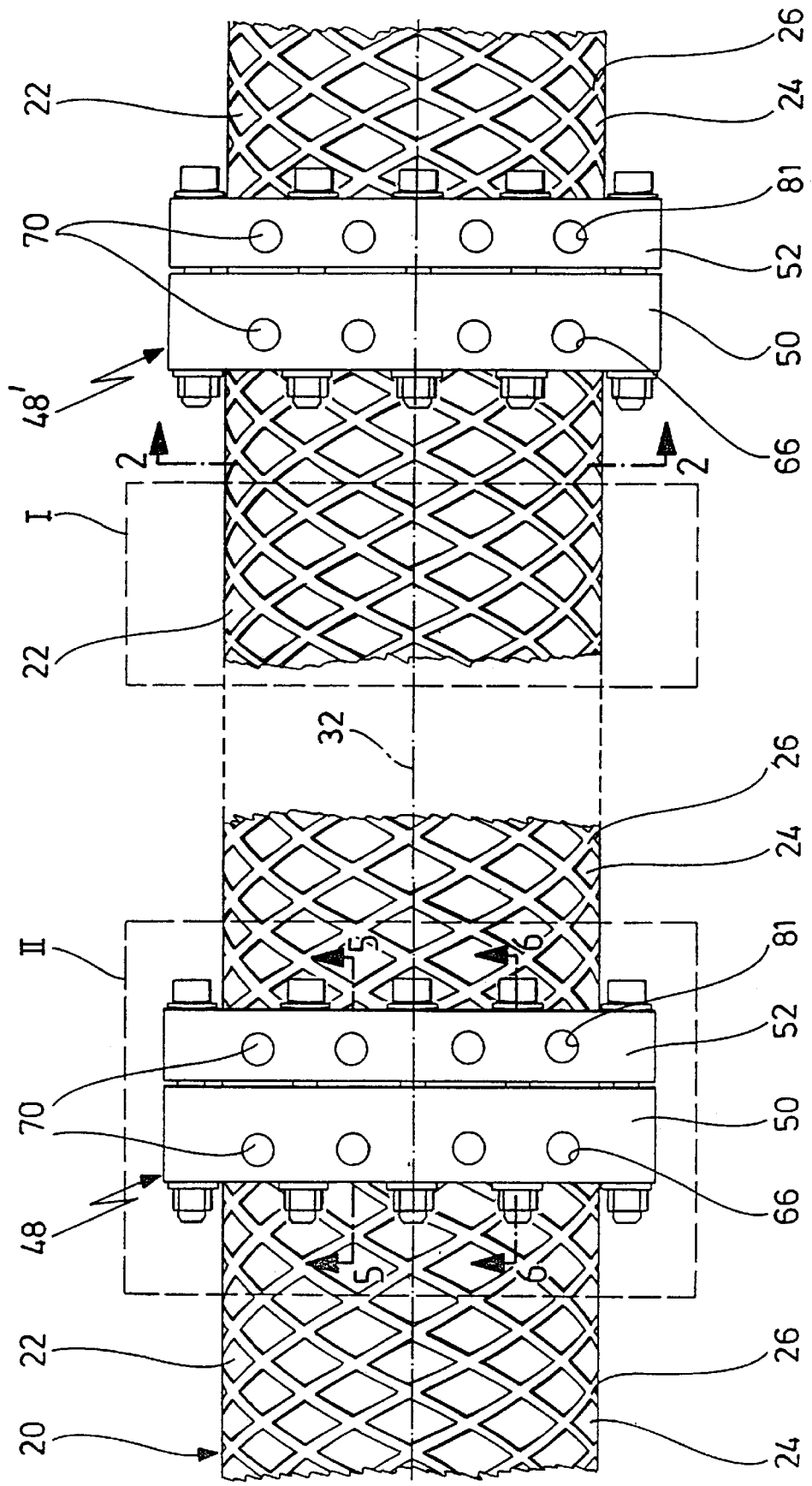
FIG. 1 is a plan view of a piping according to the invention with two pipe connections.
Figure 2:
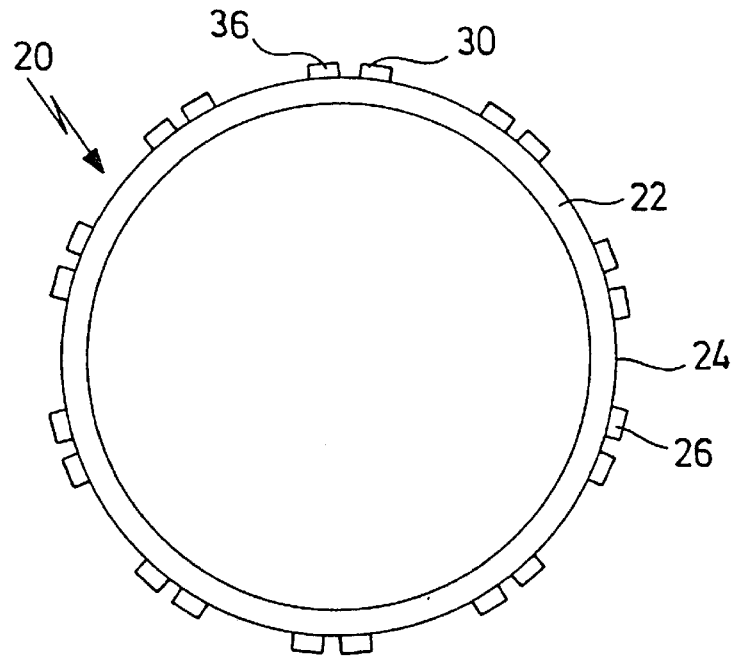
FIG. 2 is a cross-section through the piping taken along the line 2—2 in FIG. 1.

As will be seen from FIG. 1, the first flange element 50 and second flange element 52 also contain the same axial holes 82 and 84 respectively, extending right through them; the holes are arranged equidistant from each other along the circumference of the flange elements 50 and 52, in each case between two radial tapped holes 66 and 81, an axial hole 82 in the first flange element 50 in each case being aligned with an axial hole 84 in the second flange element 52.

Each pair of axial holes 82 and 84 has a clamping screw 86 passing through them; the head 88 of the screw lies on a first washer 90, which in turn lies on the end of the second flange element 52 remote from the first flange element 50. A clamping nut 92 is screwed onto one end of the screw 86 carrying external thread and projecting from the axial hole 82 in the first flange element 50; it lies on a second washer 94, which in turn lies on the end of the first flange element 50 remote from the second flange element 52.

By tightening the clamping nuts 92 on the clamping screws 86 the two flange elements 50 and 52 and thus the lattice nodes 38a and 38b positively fixed thereto can be moved towards each other.

The lattices 26 of the two pipes 22a and 22b are also fastened at the ends of the pipes remote from the pipe connection 48, e.g. by a pipe connection 48' of similar structure to the connection 48 (see FIG. 1), so that the lattices 26 of the pipes 22 can undergo longitudinal expansion axially of the pipes 22 by tightening the nuts 92 on the screws 86.

By bracing the flange elements 50 and 52 against each other force can thus be introduced into the lattice 26 longitudinally of the pipes 22a, 22b.

Thus the flange elements 50 and 52 which can be braced against each other, together with the fixing pins 70 and the positive connection elements 74a, 74b, act as force introduction means for the lattices 26. The end portions of the pipes 22, in which the fixing pins 70 engage in apertures 42 in the lattices 26, form fixing areas in which the lattices 26 are fixed relative to the respective pipes 22.

Owing to the frustoconical shape of the force introduction tips 72 of the fixing pins 70, the pipes 22a, 22b can further have a compressive bias applied directly to them right to their end portions.

The lattices 26 can slide freely over the outer walls 24 of the pipes 22 between the pipe connections 48, 48'. Since the angle at which the lattice bars 30 and 36 of the first family 28 and second family 34 intersect can be changed relatively easily, longitudinal expansion of the lattices 26 is effected primarily by shear deformation and longitudinal expansion of the lattice bars 30, 36 rather than by bending deformation of the lattice braces 40. This leads to a reduction of bending stresses at the lattice nodes 38, so that the lattices 26 are loaded substantially only in one dimension, namely in the longitudinal direction of the braces 40, and the full unidirectional strength of the fibre composites from which the lattice bars 30, 36 are made can thus be utilized in the direction of the fibres.

On shear deformation of the lattice bars 30, 36 to take up the longitudinal expansion of the lattices 26, the length of the first diagonals 44 of the lattice apertures 42 increases while the length of the second diagonals 46 decreases. The longitudinal expansion of the lattices 26 consequently leads to transverse contraction thereof, so that the lattices 26 shrink onto the associated pipes 22 and apply a compressive bias to the respective pipe 22 around the circumference.

If the interior of the piping 20 is filled with a fluid under an internal pressure, a tensile stress around the circumference is applied to each of the pipes 22 by virtue of the internal pressure and is in the opposite direction to the compressive bias resulting from transverse contraction of the relevant lattice 26. The tensile stress around the circumference, to be taken up by the material of the pipes 22 by virtue of the internal pressure, is thus reduced by the amount of bias introduced into the pipes 22 by means of the reinforcement (the lattices 26), so that the maximum internal pressure sustainable by the piping 20 increases correspondingly.

The compressive bias is ideally adjusted by tightening the clamping nuts 92, so that it is substantially equal to the tensile stress around the circumference based on the envisaged internal operating pressure (e.g. of 40 bars). This ensures that the pipes 22 are virtually stress-free in the operative state.

Since the friction between the lattice bars 30, 36 and the outer wall 24 of the pipes 22 may reduce the compressive bias produced by longitudinal expansion of the lattices 26 in the central portion of each pipe 22, it is beneficial when mounting the piping 20 first to pre-expand the lattices 26 so that a compressive bias going beyond the aforementioned ideal value is obtained in the marginal portions of the pipes 22. The pre-expansion of the lattices 26 is then reduced sufficiently to obtain a uniform compressive bias with the aforementioned ideal value along the pipes 22.

Alternatively, or in addition to raising the compressive bias beyond the ideal value when assembling the piping 20, provision may be made for reducing friction between the bars 30, 36 and the outer walls 24 of the pipes 22 by the use of lubricants such as creep oils, in order to avoid undesirable reduction of the compressive bias.

Another advantage of the piping 20 according to the invention is that the lattices 26 reduce the tensile stress in an axial direction which has to be taken up by the pipes 22 owing to the internal pressure.

Finally, the piping 20 according to the invention is also more resistant to damage from the outside, caused e.g. by impact with a foreign body, than conventional pipings.

On the one hand the biassed pipes 22 only show cracking on a stronger impulse from a foreign body striking the piping 20 than do conventional pipings; on the other hand any cracking which may occur is not catastrophic, as it is with conventional pipings with pipes of brittle material, e.g. glass; owing to the reinforcement only small cracks form, through which the fluid contained in the piping 20 only escapes in small quantities and through which the internal pressure only drops gradually, so that in the event of damage there is sufficient time to take damage limitation measures.

What is claimed is:

1. A piping, comprising:
   at least one pipe having a circumference and extending longitudinally;
   an expandable reinforcement arranged on an outer wall of each pipe; and
   force introduction means for expanding the reinforcement longitudinally of the pipe; wherein:
   the expandable reinforcement is expandable longitudinally of the pipe and has a transverse contraction capacity for applying a compressive bias around the circumference of the pipe when expanded.

2. A piping according to claim 1, wherein on expansion of the reinforcement longitudinally of the pipe without any impedance of transverse contraction, the elasticity of the reinforcement is at the most approximately equal to its elasticity on expansion longitudinally of the pipe with transverse contraction impeded by the pipe.

3. A piping according to claim 2, wherein the elasticity of the reinforcement without any impedance of transverse contraction is at the most approximately half of the elasticity of the reinforcement with transverse contraction impeded.

4. A piping according to claim 2, wherein the elasticity of the reinforcement without any impedance of transverse contraction is at the most approximately one-tenth of the elasticity of the reinforcement with transverse contraction impeded.

5. A piping according to claim 1, wherein the reinforcement, at fixing areas spaced apart longitudinally of the pipe, is fixed relative to the pipe in the longitudinal direction thereof, and between the fixing areas is capable of sliding over the outer wall of the pipe.

6. A pipe according to claim 1, wherein the reinforcement has a transverse contraction number of at least 0.4.

7. A piping according to claim 6, wherein the transverse contraction number of the reinforcement is at least 1.0.

8. A piping according to claim 1, wherein the reinforcement has at least one aperture.

9. A piping according to claim 1, wherein the reinforcement is pre-expanded longitudinally of the pipe, and a compressive bias around the circumference of the pipe is applied to the pipe through the pre-expansion of the reinforcement.

10. A piping according to claim 9, wherein the compressive bias on the pipe around the circumference is opposed and substantially equal to the tensile stress on the pipe around the circumference, caused by the internal operating pressure on the pipe.

11. A piping according to claim 1, wherein the reinforcement is fixed relative to the pipe by the force introduction means.

12. A piping according to claim 1, wherein the reinforcement has apertures into which force introduction elements of the force introduction means engage.

13. A piping according to claim 12, wherein the force introduction elements form a positive connection with the reinforcement, which connection fixes the reinforcement longitudinally of the pipe relative to the force introduction elements.

14. A piping according to claim 13, wherein the force introduction elements form the positive connection together with edgings of apertures in the reinforcement.

15. A piping according to claim 13, wherein the force introduction elements form the positive connection together with edgings of apertures in the reinforcement and together with positive connection elements, which are arranged between the force introduction elements and the edgings and made of hardened material, the hardened material being inserted in a pasty or fluid form.

16. A piping according to claim 12, wherein the force introduction means of a pipe are arranged at an end portion of the pipe.

17. A piping according to claim 12, wherein the force introduction means of a pipe comprise at least one flange element, to which the force introduction elements are attached.

18. A piping according to claim 17, wherein a force in the longitudinal direction of the pipe can be directed into the flange element.

19. A piping according to claim 18, wherein the piping comprises at least one pipe connection, at which two pipes adjoin, and a flange element to which force introduction elements of one pipe and of the other pipe are attached.

20. A piping according to claim 18, wherein the piping comprises at least one pipe connection, at which two pipes adjoin, a first flange element to which force introduction elements of one pipe are attached, and a second flange element to which force introduction elements of the other pipe are attached, the first flange element and the second flange element being capable of being attached to each other an adjustable distance apart longitudinally of the pipes.

21. A piping according to claim 1, wherein the reinforcement has apertures arranged in a substantially periodic pattern longitudinally of the pipe.

22. A piping according to claim 21, wherein the pattern has a periodicity length less than approximately one-fifth of the circumference of the pipe.

23. A piping according to claim 21, wherein the pattern has a periodicity length less than approximately one-tenth of the circumference of the pipe.

24. A piping according to claim 21, wherein the pattern is made up of a plurality of component patterns substantially periodic longitudinally of the pipe and with substantially the same periodicity length, the apertures in one respective component pattern being offset from the apertures in the other component patterns longitudinally of the pipe, by a distance shorter than the periodicity length of the component patterns.

25. A piping according claim 21, wherein the reinforcement comprises a lattice of intersecting lattice bars extending along the outer wall of the pipe.

26. A piping according to claim 25, wherein the lattice comprises families of lattice bars, the bars of each family being aligned parallel with the bars of the same family and crossing the bars of other families.

27. A piping according to claim 26, wherein the lattice comprises at least one pair of families of lattice bars, the bars of one family of the pair and the bars of the other family of the pair being aligned at equal, opposing angles to the longitudinal direction of the pipe.

28. A piping according to claim 26, wherein the lattice comprises two families of lattice bars.

29. A piping according to claim 28, wherein the lattice bars of one family and the lattice bars of the other family are aligned at equal, opposing angles to the longitudinal direction of the pipe.

30. A piping according to claim 29, wherein the opposing equal angle is approximately 58° to 68°.

31. A piping according to claim 29, wherein the opposing equal angles, at which the lattice bars of one family and the lattice bars of the other family are arranged with respect to the longitudinal direction of the pipe, vary along the pipe.

32. A piping according to claim 29, wherein the opposing equal angle increases uniformly from one fixing area of the pipe to the next.

33. A piping according to claim 29, wherein the opposing equal angle increases uniformly from fixing areas of the pipe to a central area of the pipe between the fixing areas thereof.

34. A piping according to claim 1, wherein the reinforcement consists at least partly of a fiber composite.

35. A piping according to claim 34, wherein the reinforcement consists at least partly of carbon fibers.

36. A piping according to claim 34, wherein the reinforcement consists at least partly of glass fibers.

37. A piping according to claim 1, wherein a lubricant is arranged between the reinforcement and the outer wall of the pipe.

38. A piping according to claim 37, wherein the surface of the reinforcement facing towards the outer wall of the pipe is provided with lubricant.

39. A piping according to claim 37, wherein the reinforcement consists at least partly of a composite comprising fibers, said lubricant being embedded in a matrix of the reinforcement surrounding said fibers.

40. A piping according to claim 1, further comprising:
means for applying a compressive bias longitudinally of the pipe.

41. A piping according to claim 40, wherein the compressive bias applied longitudinally of the pipe is opposite and substantially equal to the tensile stress on the pipe longitudinally thereof caused by an internal operating pressure on the pipe.

42. A piping, comprising:
at least one pipe having a circumference and extending longitudinally;
an expandable reinforcement;
force introduction means for expanding the reinforcement longitudinally of the pipe; wherein:
the reinforcement is arranged on an outer wall of the pipe; and
the reinforcement is expandable longitudinally of the pipe and has a transverse contraction capacity for applying a compressive bias around the circumference of the pipe when expanded.

43. A piping, comprising:
at least one pipe having a circumference and extending longitudinally;
an expandable reinforcement arranged on an outer wall of each pipe; and
means for expanding the reinforcement longitudinally of the pipe; wherein:
the reinforcement has a transverse contraction capacity for applying a compressive bias around the circumference of the pipe when expanded; and
the reinforcement, at fixing areas spaced apart longitudinally of the pipe, is fixed relative to the pipe in the longitudinal direction thereof, and between the fixing areas is capable of sliding over the outer wall of the pipe.

44. A piping, comprising:
at least one pipe having a circumference and extending longitudinally;
an expandable reinforcement arranged on an outer wall of each pipe; and
means for expanding the reinforcement longitudinally of the pipe; wherein:
the reinforcement has a transverse contraction capacity for applying a compressive bias around the circumference of the pipe when expanded; and
a lubricant is arranged between the reinforcement and the outer wall of the pipe.

45. A piping according to claim 44, wherein the surface of the reinforcement facing towards the outer wall of the pipe is provided with lubricant.

46. A piping according to claim 44, wherein the reinforcement consists at least partly of a composite comprising fibers, said lubricant being embedded in a matrix of the reinforcement surrounding said fibers.

47. A piping, comprising:
at least one pipe having a circumference and extending longitudinally;
an expandable reinforcement arranged on an outer wall of each pipe; and
means for expanding the reinforcement longitudinally of the pipe; wherein:
the reinforcement has a transverse contraction capacity for applying a compressive bias around the circumference of the pipe when expanded; and
the reinforcement comprises a lattice of intersecting lattice bars extending along the outer wall of the pipe.

48. A piping according to claim 47, wherein the lattice comprises families of lattice bars, the bars of each family being aligned parallel with the bars of the same family and crossing the bars of other families.

49. A piping according to claim 48, wherein the lattice comprises two families of lattice bars.

50. A piping according to claim 49, wherein the lattice bars of one family and the lattice bars of the other family are aligned at equal, opposing angles to the longitudinal direction of the pipe.

51. A piping according to claim 50, wherein the opposing equal angle is approximately 58° to 68°.

52. A piping according to claim 50, wherein the opposing equal angles, at which the lattice bars of one family and the lattice bars of the other family are arranged with respect to the longitudinal direction of the pipe, vary along the pipe.

53. A piping according to claim 50, wherein the opposing equal angle increases uniformly from one fixing area of the pipe to the next.

54. A piping according to claim 50, wherein the opposing equal angle increases uniformly from fixing areas of the pipe to a central area of the pipe between the fixing areas thereof.

55. A piping according to claim 48, wherein the lattice comprises at least one pair of families of lattice bars, the bars of one family of the pair and the bars of the other family of the pair being aligned at equal, opposing angles to the longitudinal direction of the pipe.

* * * * *